(12) United States Patent
Hayes (10) Patent No.: US 9,236,088 B2
(45) Date of Patent: Jan. 12, 2016

(54) APPLICATION COMMUNICATION

(71) Applicant: FlixMaster, Inc., Boulder, CO (US)

(72) Inventor: Christopher Douglas Hayes, Boulder, CO (US)

(73) Assignee: RAPT MEDIA, INC., Boulder, CO (US)

( * ) Notice: Subject to any disclaimer, the term of this patent is extended or adjusted under 35 U.S.C. 154(b) by 0 days.

(21) Appl. No.: 13/934,800

(22) Filed: Jul. 3, 2013

(65) Prior Publication Data

US 2014/0317638 A1     Oct. 23, 2014

Related U.S. Application Data (60) Provisional application No. 61/813,531, filed on Apr. 18, 2013.

(51) Int. Cl.
| | |
|---|---|
| G06F 9/54 | (2006.01) |
| G11B 27/00 | (2006.01) |
| G11B 27/10 | (2006.01) |
| H04N 7/173 | (2011.01) |

(52) U.S. Cl.
CPC .............. *G11B 27/005* (2013.01); *G06F 9/542* (2013.01); *G11B 27/105* (2013.01)

(58) Field of Classification Search
None
See application file for complete search history.

(56) References Cited

U.S. PATENT DOCUMENTS

| | | | |
|---|---|---|---|
| 5,329,320 A | 7/1994 | Yifrach | |
| 5,524,637 A | 6/1996 | Erickson | |
| 5,576,551 A | 11/1996 | Adair | |
| 5,675,752 A | 10/1997 | Scott et al. | |
| 5,676,551 A | 10/1997 | Knight et al. | |
| 5,895,123 A | 4/1999 | Fujii et al. | |
| 6,222,925 B1 | 4/2001 | Shiels et al. | |
| 6,223,211 B1 | 4/2001 | Hamilton et al. | |
| 6,357,047 B1 | 3/2002 | Kurtze et al. | |
| 6,687,454 B1 | 2/2004 | Kuroiwa | |

(Continued)

FOREIGN PATENT DOCUMENTS

| | | |
|---|---|---|
| DE | 10053720 | 4/2002 |
| EP | 1033157 | 9/2000 |

(Continued)

OTHER PUBLICATIONS

"CD-i or Compact Disc Interactive", Wikipedia, retrieved on Aug. 9, 2011 from URL: http://en.wikipedia.org/wiki/CD-i, 6 pages.

(Continued)

*Primary Examiner* — Andy Ho
*Assistant Examiner* — Abdou Seye
(74) *Attorney, Agent, or Firm* — Dorsey & Whitney LLP (57) ABSTRACT

An external application is loaded by an electronic device. The external application loads one or more internal applications. The internal application loads a player application, such as a video player. At least one communication channel is configured between the external application and the player application. Subsequently, the player application may provide signals to the external application via the communication connection when one or more events occur. In response, the external application may perform one or more actions and/or may provide reply signals to the player application. Additionally, the player application may provide instructions to the external application and/or the external application may provide instructions to the player application.

21 Claims, 6 Drawing Sheets

(56) References Cited

U.S. PATENT DOCUMENTS

| | | | |
|---|---|---|---|
| 6,975,832 B2 | 12/2005 | Adams et al. | |
| 6,977,673 B1 | 12/2005 | McKain et al. | |
| 7,373,377 B2 | 5/2008 | Altieri | |
| 7,623,754 B1 | 11/2009 | McKain et al. | |
| 7,702,014 B1 | 4/2010 | Kellock et al. | |
| 7,788,583 B1 * | 8/2010 | Amzallag et al. | 715/719 |
| 8,156,520 B2 | 4/2012 | Casagrande et al. | |
| 8,380,049 B2 | 2/2013 | Lang et al. | |
| 8,600,220 B2 | 12/2013 | Bloch et al. | |
| 8,732,180 B2 | 5/2014 | Lindahl et al. | |
| 2002/0082063 A1 | 6/2002 | Miyaki et al. | |
| 2002/0091455 A1 | 7/2002 | Williams | |
| 2002/0120456 A1 | 8/2002 | Berg et al. | |
| 2003/0169295 A1 | 9/2003 | Becerra, Jr. | |
| 2004/0009813 A1 | 1/2004 | Wind | |
| 2004/0193441 A1 | 9/2004 | Altieri | |
| 2005/0071736 A1 | 3/2005 | Schneider et al. | |
| 2005/0102707 A1 | 5/2005 | Schnitman | |
| 2005/0120389 A1 | 6/2005 | Boss et al. | |
| 2005/0217462 A1 | 10/2005 | Thomson et al. | |
| 2006/0268007 A1 | 11/2006 | Gopalakrishnan | |
| 2007/0020604 A1 | 1/2007 | Chulet | |
| 2007/0112837 A1 | 5/2007 | Houh et al. | |
| 2007/0118801 A1 | 5/2007 | Harshbarger et al. | |
| 2007/0162395 A1 | 7/2007 | Ben-Yaacov et al. | |
| 2007/0239754 A1 | 10/2007 | Schnitman | |
| 2008/0163089 A1 | 7/2008 | Altieri | |
| 2008/0300967 A1 | 12/2008 | Buckley et al. | |
| 2008/0320531 A1 * | 12/2008 | Kim et al. | 725/87 |
| 2009/0022159 A1 | 1/2009 | Coleman et al. | |
| 2009/0172022 A1 | 7/2009 | Bathiche et al. | |
| 2009/0228572 A1 | 9/2009 | Wall et al. | |
| 2010/0031149 A1 | 2/2010 | Gentile et al. | |
| 2010/0088735 A1 | 4/2010 | Sadja et al. | |
| 2010/0186579 A1 | 7/2010 | Schnitman | |
| 2010/0242110 A1 * | 9/2010 | Louch et al. | 726/22 |
| 2010/0293455 A1 | 11/2010 | Bloch | |
| 2010/0332404 A1 | 12/2010 | Valin | |
| 2011/0028213 A1 | 2/2011 | Dusenberry et al. | |
| 2011/0126106 A1 | 5/2011 | Ben Shaul et al. | |
| 2011/0200116 A1 | 8/2011 | Bloch et al. | |
| 2011/0202562 A1 | 8/2011 | Bloch et al. | |
| 2013/0104024 A1 * | 4/2013 | Rajkumar et al. | 715/234 |
| 2013/0259442 A1 | 10/2013 | Bloch et al. | |
| 2014/0019863 A1 | 1/2014 | Callanan | |
| 2014/0026175 A1 | 1/2014 | Callanan | |
| 2014/0033038 A1 | 1/2014 | Callanan | |
| 2014/0078397 A1 | 3/2014 | Bloch et al. | |
| 2014/0082666 A1 | 3/2014 | Bloch et al. | |
| 2014/0178051 A1 | 6/2014 | Bloch et al. | |
| 2014/0376883 A1 | 12/2014 | Callanan | |

FOREIGN PATENT DOCUMENTS

| | | |
|---|---|---|
| EP | 2712206 A1 | 3/2014 |
| GB | 2428329 | 1/2007 |
| WO | 2008/052009 | 5/2008 |
| WO | 2010/131244 | 11/2010 |
| WO | 2010131244 A1 | 11/2010 |
| WO | 2012/114329 | 8/2012 |
| WO | 2012/114330 | 8/2012 |
| WO | 2012114330 A1 | 8/2012 |
| WO | 2013/150378 | 10/2013 |

OTHER PUBLICATIONS

"Dragon's Lair", Wikipedia, retrieved on Aug. 9, 2011 from URL: http://en.wikipedia.org/wiki/Dragon%27s_Lair, 11 pages.

"Laserdisc video game", Wikipedia, retrieved on Aug. 9, 2011 from URL: http://en.wikipedia.org/wiki/Laserdisc_video_game, 2 pages.

"You Tube Help—Creating or editing annotations", YouTube, retrieved on Aug. 9, 2011 from URL: http://www.google.com/support/youtube/bin/answer.py?answer=92710&topic=14354, 5 pages.

"EP Supplemental Search Report dated Jun. 28, 2012", EP Application No. 2430631, 2 Pages.

"PCT International Search Report and Written Opinion dated Mar. 8, 2012", PCT Application No. PCT/US2011/056453, filed Oct. 14, 2011, 12 pages.

"PCT International Search Report dated Aug. 25, 2010", PCT Application No. PCT/IL2010/000362, 2 pages.

"US Non-Final Office Action dated Jul. 23, 2012", U.S. Appl. No. 13/034,645, 13 pages.

"Official word from Google", retrieved on Apr. 7, 2014 from URL: https://support.google.com/webmasters/answer/34445?hl=en, 1 page.

"An iFrame test", retrieved on Apr. 7, 2014 from URL: http://www.rimmkaufman.com/blog/do-search-engines-follow-links-in-iframes/31012012/, 11 pages.

"http://www.readwritethink.org/classroom-resources/student-interactives/plot-diagram-30040.html", earliest date Feb. 21, 2010,.

Final Office Action dated Apr. 10, 2014, for U.S. Appl. No. 13/274,224.

Non-Final Office dated Sep. 13, 2013, for U.S. Appl. No. 13/274,224.

Non-Final Office Action dated Aug. 29, 2014, for U.S. Appl. No. 13/934,446.

Non-Final Office Action dated Sep. 10, 2014, for U.S. Appl. No. 13/935,014.

"U.S. Non-Final Office Action", U.S. Non-Final Office Action dated Jan. 12, 2015, U.S. Appl. No. 13/274,224, 4 pages.

"U.S. Notice of Allowance and Fee(s) Due", U.S. Notice of Allowance and Fee(s) Due dated Jan. 7, 2015, U.S. Appl. No. 13/935,014, 10 pages.

* cited by examiner

APPLICATION COMMUNICATION

CROSS-REFERENCE TO RELATED APPLICATION

The present application claims the benefit under 35 U.S.C. §119(e) to U.S. Provisional Patent Application No. 61/813,531, which was filed on Apr. 18, 2013, entitled "SYSTEM AND METHOD FOR CREATING AND ANALYZING INTERACTIVE EXPERIENCES," which is incorporated by reference as if fully disclosed herein.

TECHNICAL FIELD

This disclosure relates generally to application communication, and more specifically to application programming interfaces for communicating between multiple applications through independent intermediary applications.

BACKGROUND

Modern applications frequently involve pulling in information and functionality from multiple other sources, including other applications. Bringing together multiple independent applications in this manner often creates a disjointed, clumsy experience that feels more like interacting with many separate interfaces, rather than one seamless, integrated interface. As software applications become more interrelated, this transition between application contexts becomes more important, as does making it as smooth and transparent as possible.

For example, a web page presented by a web browser may call one or more components. As such, the web page may be an external application and the components may be internal applications. Such components may include iframes, widgets, and so on. Such internal applications may call one or more players, such as one or more video players. Thus, multiple independent applications may be simultaneously operating that may create a disjointed, clumsy experience that feels more like interacting with many separate interfaces, rather than one seamless, integrated interface.

SUMMARY

The present disclosure discloses systems, methods, and computer program products for communication between applications. An external application may be loaded. The external application may load one or more internal applications. The internal application may load a player application, such as a video player. At least one communication channel may be configured between the external application and the player application. Subsequently, the player application may provide signals to the external application via the communication connection when one or more events occur. In response, the external application may perform one or more actions and/or may provide reply signals to the player application. Additionally, the player application may provide instructions to the external application and/or the external application may provide instructions to the player application.

For example, the external application may be a web page rendered by a web browser. In such an example, the web page may call one or more internal applications which may be one or more components of the web page. Such a component may call the player application and a communication connection may then be configured between the web page and the player application.

In various implementations, the internal application may perform the configuration of the communication connection between the external application and the player application. In some cases, configuration of the communication connection may be accomplished by including code for such configuration (such as one or more scripting language instructions) in the web page which is then executed as part of loading the web page to configure the communication connection. Such code may be at least a portion of an application programming interface. In one or more cases, configuring the communication connection between the external application and the player application may include negotiating a trusted connection between the external application and the player application.

As discussed above, the player application may provide signals to the external application via the communication connection when one or more events occur. Such events may include a transition, a user interaction, an interface selection, a video transition, a portion complete, a time reached, and/or any other such event that may occur during operation of the player application.

Further, as discussed above, the external application may perform one or more actions in response to a signal from the player application indicating the occurrence of an event. Such actions may include recording the occurrence of the at least one event, changing an aspect of a web page presented by the external application, transmitting at least one instruction to the at least one player, adding at least one item to at least one shopping cart, utilizing at least one hardware component of at least one device incorporating the at least one processing unit, changing the content of the at least one player, enabling at least one form, requiring at least one form, presenting a different web page utilizing the external application, and/or any other such action performable by the external application.

Additionally, as discussed above, the external application may provide instructions to the player application. Such instructions may include an instruction to switch content being played, an instruction to pause play, an instruction to stop play, an instruction to fast forward play, an instruction to rewind play, an instruction to alter volume, or an instruction concerning an event for which the at least one player to monitor and report regarding, and/or any other instruction performable by the player application.

Moreover, as discussed above, in some implementations the player application may provide instructions to the external application. Such instructions may include an instruction to perform at least one of change an aspect of a web page presented by the external application, add at least one item to at least one shopping cart, utilize at least one hardware component of at least one device incorporating the at least one processing unit, enable at least one form, require at least one form, present a different web page utilizing the external application, and/or any other instruction performable by the external application.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, methods, and computer program products that embody various elements of the present disclosure. However, it should be understood that the described disclosure may be practiced in a variety of forms in addition to those described herein.

The present disclosure describes a communication structure that may allow communication from one application to another, through any number of intermediate applications. This communication structure may allow the applications to send and receive messages between one another, and act upon these signals to provide a more integrated, seamless experience.

The present disclosure discloses systems, methods, and computer program products for communication between applications. An external application may be loaded. The external application may load one or more internal applications. The internal application may load a player application, such as a video player. At least one communication channel may be configured between the external application and the player application.

Subsequently, the player application may provide signals to the external application via the communication connection when one or more events occur. In response, the external application may perform one or more actions and/or may provide reply signals to the player application. Additionally, the player application may provide instructions to the external application and/or the external application may provide instructions to the player application.

For example, the external application may be a web page rendered by a web browser. In such an example, the web page may call one or more internal applications which may be one or more components of the web page. Such a component may call the player application and a communication connection may then be configured between the web page and the player application.

In various implementations, the internal application may perform the configuration of the communication connection between the external application and the player application. In some cases, configuration of the communication connection may be accomplished by including code for such configuration (such as one or more scripting language instructions) in the web page which is then executed as part of loading the web page to configure the communication connection. Such code may be at least a portion of an application programming interface. In one or more cases, configuring the communication connection between the external application and the player application may include negotiating a trusted connection between the external application and the player application.

As discussed above, the player application may provide signals to the external application via the communication connection when one or more events occur. Such events may include a transition, a user interaction, an interface selection, a video transition, a portion complete, a time reached, and/or any other such event that may occur during operation of the player application.

Further, as discussed above, the external application may perform one or more actions in response to a signal from the player application indicating the occurrence of an event. Such actions may include recording the occurrence of the at least one event, changing an aspect of a web page presented by the external application, transmitting at least one instruction to the at least one player, adding at least one item to at least one shopping cart, utilizing at least one hardware component of at least one device incorporating the at least one processing unit, changing the content of the at least one player, enabling at least one form, requiring at least one form, presenting a different web page utilizing the external application, and/or any other such action performable by the external application.

Additionally, as discussed above, the external application may provide instructions to the player application. Such instructions may include an instruction to switch content being played, an instruction to pause play, an instruction to stop play, an instruction to fast forward play, an instruction to rewind play, an instruction to alter volume, or an instruction concerning an event for which the at least one player to monitor and report regarding, and/or any other instruction performable by the player application.

Moreover, as discussed above, in some implementations the player application may provide instructions to the external application. Such instructions may include an instruction to perform at least one of change an aspect of a web page presented by the external application, add at least one item to at least one shopping cart, utilize at least one hardware component of at least one device incorporating the at least one processing unit, enable at least one form, require at least one form, present a different web page utilizing the external application, and/or any other instruction performable by the external application.

Figure 1:
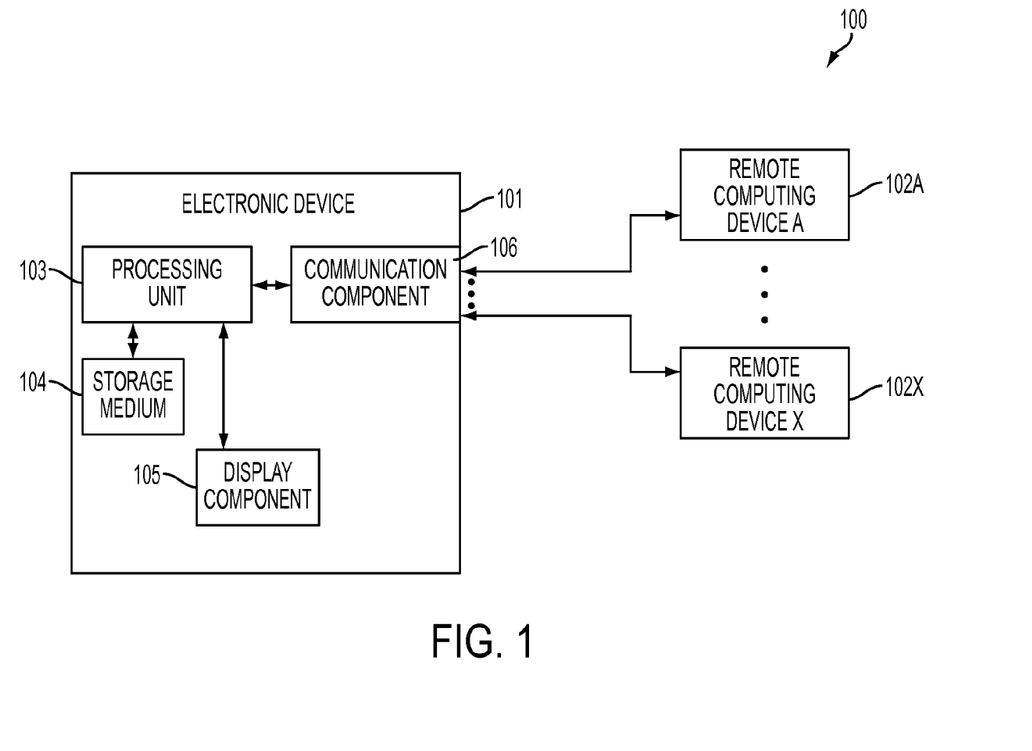
FIG. 1 is a block diagram illustrating a system for application communication.

FIG. 1 is a block diagram illustrating a system 100 for application communication. The system 100 includes a electronic device 101 which may be any kind of electronic device such as a laptop computer, a desktop computer, a tablet computer, a mobile computer, a cellular telephone, a smart phone, a personal digital assistant, a digital media player, and/or any other such electronic device.

The electronic device 101 may include one or more processing units 103, one or more non-transitory storage media 104 (which may take the form of, but is not limited to, a magnetic storage medium; optical storage medium; magneto-optical storage medium; read only memory; random access memory; erasable programmable memory; flash memory; and so on), one or more display components 105 (such as one or more cathode-ray tube displays, one or more liquid crystal displays, one or more plasma displays, one or more light emitting diode displays, one or more organic light emitting diode displays, and/or other such displays), and/or one or more communication components.

Figure 2:
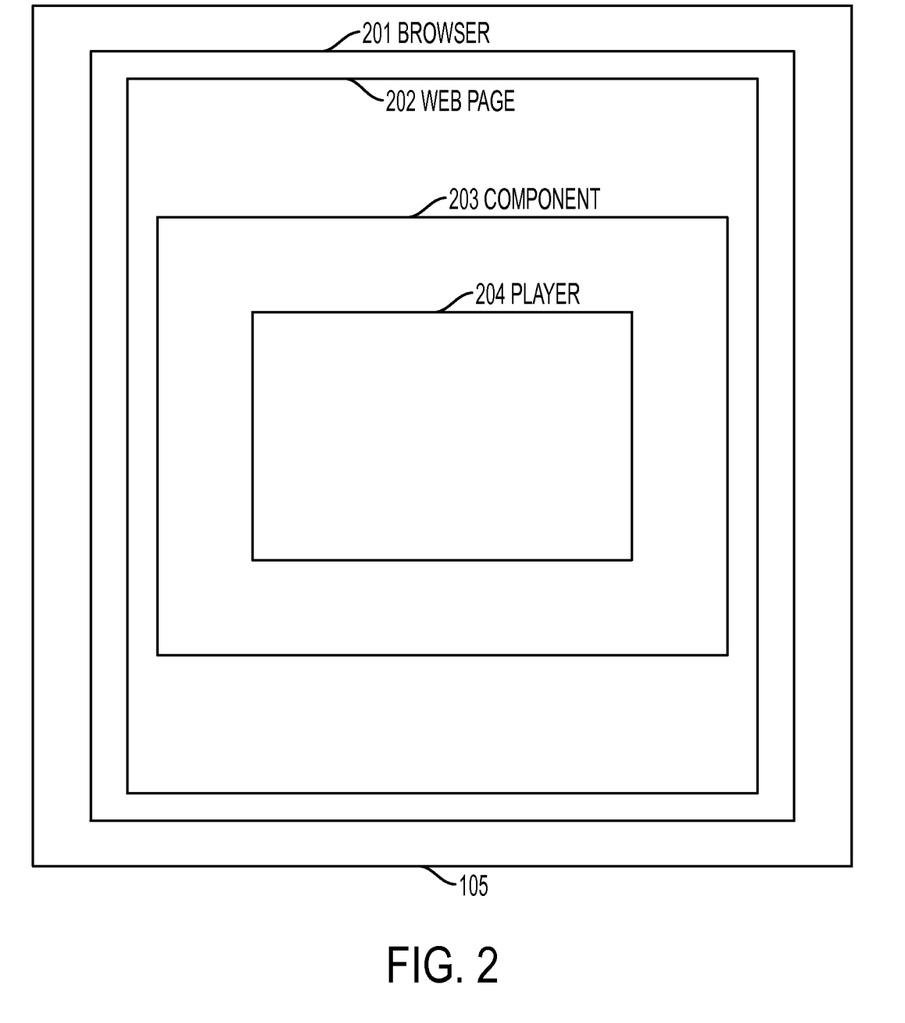
FIG. 2 is a diagram illustrating web page presented in a browser including a component that itself includes a player application. This web page may be presented by the system of FIG. 1.

The processing unit 103 may be operable to execute one or more instructions stored in the storage medium 104 to perform one or more electronic device functions. Such functions may include executing a browser (which may be a web browser), such as the browser illustrated as displayed on the display component 105 in FIG. 2. As illustrated, the browser loads a web page 202. The web page 202 may load one or more components (which may include one or more iframes, widgets, and so on) such as component 203. The component 203 may load a player application 204, which may be a video player application. The web page 202 may be an external application as it calls the component 203, which may be an internal application as the component 203 is called by the web page 202. Returning to FIG. 1, though browser execution is listed as an example of an electronic device function, it is understood that this is for the purposes of example and in various implementations the electronic device 101 may perform a variety of different functions.

The electronic device 101 may load an external application (such as a web page and/or other application). The external application may load one or more internal applications (such as components of a web page or other internal applications). The internal application may load a player application (such as a video player or other player application). At least one communication channel may be configured between the external application and the player application.

Subsequently, the player application may provide signals to the external application via the communication connection when one or more events occur. In response, in some implementations, the external application may perform one or more actions and/or may provide reply signals to the player application.

Additionally, the external application may provide instructions to the player application in some implementations. Moreover, in various implementations, the player application may provide instructions to the external application.

In some implementations, the external application, internal application(s), and/or the player application may be loaded from the storage medium 104. However, in various implementations, the system 100 may include one or more remote computing devices A-X 102A-102X with which the electronic device is capable of communicating via the communication component 106 and/or one or more different communication media. In such cases, one or more of the external application, internal application(s), and/or the player application may be loaded from one or more of the computing devices A-X 102A-102X.

In various implementations, the internal application may perform the configuration of the communication connection between the external application and the player application. For example, when the internal application loads the player application, the internal application may configure the communication connection between the external application and the player application. Subsequently, the external application and the player application may communicate without involving the internal application.

In various implementations, the external application may be a web page and/or a component of a web page. In such cases, configuration of the communication connection may be accomplished by including code for such configuration (including one or more scripting language instructions such as JavaScript) in the web page which is then executed as part of loading the web page to configure the communication connection. Such code may be at least a portion of an application programming interface that is provided to enable web pages and/or components of web pages to communicate directly with player applications called by internal applications.

In such cases, the designer or builder of a web page and/or web page component may determine whether or not a player application is allowed to communicate directly with the web page and/or web page component by including or omitting the code in the web page and/or web page component. If the code is not included, the web page and/or web page component may not be able to communicate directly with the player application regardless of any messages transmitted by the player application.

In one or more cases, configuring the communication connection between the external application and the player application may include negotiating a trusted connection between the external application and the player application. Such trusted connection negotiation may include one or more key exchanges, encryption, certificate exchanges, authentication schemes, and/or other such trusted connection negotiation protocols.

As discussed above, the player application may provide signals to the external application via the communication connection when one or more events occur. Such events may include any events that may occur during operation of the player application. For example, the player application may provide a signal whenever the player application encounters a transition (such as a transition from a first video to a second video). By way of another example, the player application may provide a signal whenever a user interaction is received. Such a user interaction may be an interface selection (such as selection of a presented button) and/or any other such interaction by a user with the player application (which may indicate a change of status of the media content being played such as stopped, paused, fast forwarded, rewound, and so on). By way of still another example, the player application may provide a signal when the player reaches a portion completed of a media content being played, a time reached in the media content being played, and/or any other such status of the media being played (such as play of the media content has been stopped, paused, fast forwarded, rewound, and so on).

Further, as discussed above, the external application may perform one or more actions in response to a signal from the player application indicating the occurrence of an event. Such actions may include any kind of actions that the external application is configured to perform upon receipt of the signal. For example, the external application may respond by recording the occurrence of the event, such as in one or more maintained analytics databases. By way of a second example, the external application may respond by changing an aspect of the external application (such as changing an aspect of a web page presented by the external application or by redirecting to present a different web page). By way of a third example, the external application may respond by transmitting at least one instruction to the player application. By way of a fourth example, the external application may respond by adding at least one item to at least one shopping cart. By way of a fifth example, the external application may respond by utilizing at least one hardware component of the electronic device 101. By way of a sixth example, the external application may respond by changing the content of the at least one player. By way of a seventh example, the external application may respond by enabling at least one form. By way of an eighth example, the external application may respond by requiring at least one form.

Additionally, as discussed above, the external application may provide instructions to the player application. Such instructions may include any instruction that is performable by the player application. For example, the external application may instruct the player application to switch content being played. By way of a second example, the external application may instruct the player application to pause play. By way of a third example, the external application may instruct the player application to stop play. By way of a fourth example, the external application may instruct the player application to fast forward play. By way of a fifth example, the external application may instruct the player application to rewind play. By way of a fifth example, the external application may instruct the player application to alter volume. By way of a sixth example, the external application may instruct the player application concerning an event for which the at least one player is to monitor and report regarding.

Moreover, as discussed above, in some implementations the player application may provide instructions to the external application. Such instructions may include any other instruction that the external application is capable of performing. For example, the player application may instruct the external application to perform at least one of change an aspect of a web page presented by the external application. By way of a second example, the player application may instruct the external application to add at least one item to at least one shopping cart. By way of a third example, the player application may instruct the external application to utilize at least one hardware component of the electronic device 101. By way of a fourth example, the player application may instruct the external application to enable at least one form. By way of a fifth example, the player application may instruct the external application to require at least one form. By way of a sixth example, the player application may instruct the external application to present a different web page utilizing the external application.

Detailed example implementations will now be discussed. In a first example implementation, a smart phone may load a web page from a web server utilizing a browser application. The web page may load a first iframe that includes content from a video content server as a component of the web page. The content from the video content server loaded in the iframe may load an embedded iframe that includes a video player which plays video content from the video content server. As part of such loading, the first iframe may configure a communication channel between the web page and the video player. In this first example implementation, the web page may be configured to track how much of embedded videos are actually viewed by users instead of merely loaded and only partially watched. Further in this example, the video player may be configured to provide signals to the web page indicating when various points in the played video are reached (such as 25%, 50%, 75%, and 98%). The web page may receive such signals and record the signals in an analytics database (which may be reported back to the web server). In this way, the information stored in the analytics database may be utilized to determine not only how often videos were viewed via the web page, but also how much of the videos users viewed.

In a second example implementation, a laptop computer may load a web page from a web server utilizing a browser application. The web page may load a first iframe that includes content from a video content server as a component of the web page. The content from the video content server loaded in the iframe may load an embedded iframe that includes a video player which plays an interactive series of video content segments from the video content server. As part of such loading, the first iframe may configure a communication channel between the web page and the video player. In this second example implementation, the web page may be configured to change advertisements displayed around the first iframe whenever the video content segment played by the video player switches. Further in this example, the video player may be configured to provide signals to the web page indicating when the video player transitions from one video content segment to another. The web page may receive such signals and change the advertisements in response. In this way, the web page may be able to change the advertisements presented whenever played video content segments change.

In a third example implementation, a desktop computer may load a web page from a web server utilizing a browser application. The web page may load a first iframe that includes content from a video content server as a component of the web page. The content from the video content server loaded in the iframe may load an embedded iframe that includes a video player which plays an interactive series of video content segments from the video content server. As part of such loading, the first iframe may configure a communication channel between the web page and the video player. In this third example implementation, the web page may include other web page components that play audio. Further in this example, the video player may be configured to instruct the web page to mute the audio played by the other web page components whenever the video player is playing a video. As such, the video player may be configured to signal the web page whenever a played video is starts, stops, is muted, it unmuted, and/or otherwise changes status and instruct the web page accordingly. The web page may receive such signals and mute or unmute the audio played by the other web page components accordingly. In this way, the video player may prevent the audio from the other web page components from interfering with the audio presented by the video player.

In a fourth example implementation, a tablet computer may load a web page from a web server utilizing a browser application. The web page may load a first iframe that includes content from a video content server as a component of the web page. The content from the video content server loaded in the iframe may load an embedded iframe that includes a video player which plays an interactive series of video content segments from the video content server. As part of such loading, the first iframe may configure a communication channel between the web page and the video player. In this fourth example implementation, the web page may include another embedded video. Further in this example, the video player may be configured to provide signals to the web page indicating when a user however a mouse cursor over the video player and to stop, start, and/or otherwise alter the status of the video player in response to instructions from the web page. Based at least on received signals regarding when the mouse cursor is hovered over the video player, the web page may instruct the video player to start, resume, and/or otherwise play video whenever the mouse cursor is moved to hover over the video player (whereupon the web page may disable the other embedded video from playing) and stop, pause, other otherwise halt play of the video when the mouse cursor is moved to no longer hover over the video player (whereupon the web page may signal enable the other embedded video to resume play). In this way, the web page may prevent the video player and the other embedded video from interfering with each other.

Figure 3:
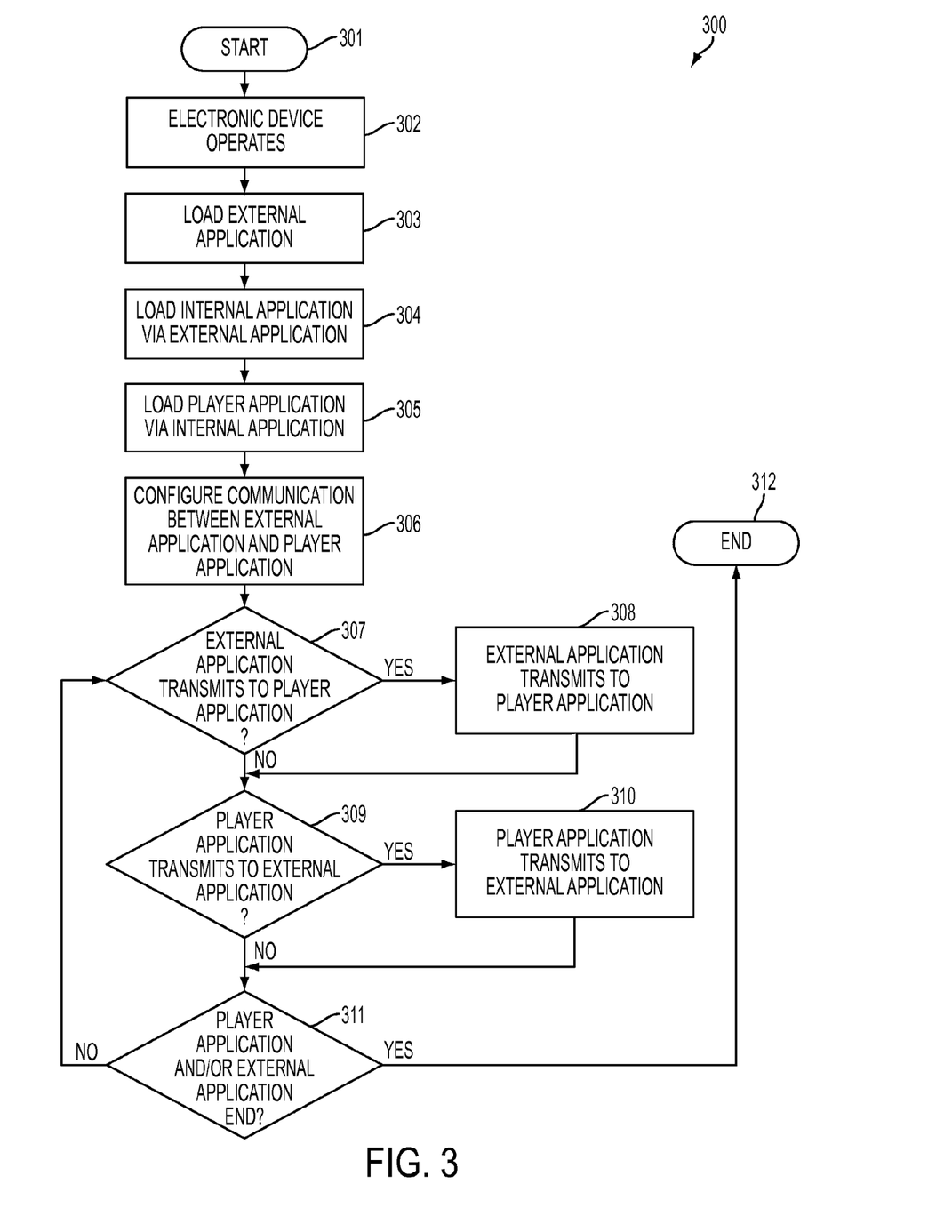
FIG. 3 is a flow chart illustrating a method for application communication. This method may be performed by the system of FIG. 1.

FIG. 3 illustrates a method 300 for application communication. The method 300 may be performed by the electronic device 101 of FIG. 1. The flow begins at block 301 and proceeds to block 302 where the electronic device operates. The flow then proceeds to block 303 where the electronic device loads an external application (such as a web page).

Next, the flow proceeds to block 304 where the external application loads an internal application (such as a component of the web page). The flow then proceeds to block 305 where the internal application loads a player application (such as a video player).

Next, the flow proceeds to block 306 where a communication channel is configured between the external application and the player application. The communication channel may be configured by the internal application and may be configured utilizing at least a portion of an application programming interface. Configuration of the communication channel may include configuring a trusted connection between the external application and the internal application.

The flow then proceeds to block 307 where the electronic device 101 determines whether or not the external application transmits a communication (such as an instruction, a notification, a response to a communication received from the player application, and/or other such communication) to the player application. If not, the flow proceeds to block 309. Otherwise, the flow proceeds to block 308 where the external application transmits the communication to the player application before the flow proceeds to block 309.

At block 309, the electronic device 101 determines whether or not the player application transmits a communication (such as an instruction, a notification, an indication of an event that occurred during performance of the player application, a response to a communication received from the external application, and/or other such communication) to the external application. If not, the flow proceeds to block 311. Otherwise, the flow proceeds to block 310 where the player application transmits the communication to the external application.

At block 311, the electronic device 101 determines whether the player application and/or the external application have ended (i.e., terminated execution). If so, the flow returns to block 302 where the electronic device continues to operate. Otherwise, the flow returns to block 307 where the electronic device determines whether or not the external application transmits a communication to the player application.

Although the method 300 is illustrated and described as including particular operations performed in a particular order, it is understood that this is for the purposes of example. In various implementations, various arrangements of the same, similar, or different operations may be performed without departing from the scope of the present disclosure.

For example, the method 300 illustrates and describes the determination of communications from the external application to the player application and from the player application to the external application as performed sequentially. However, it is understood that this is for the purposes of clarity and in various implementations these operations may be performed simultaneously and/or substantially simultaneously.

Figure 4:
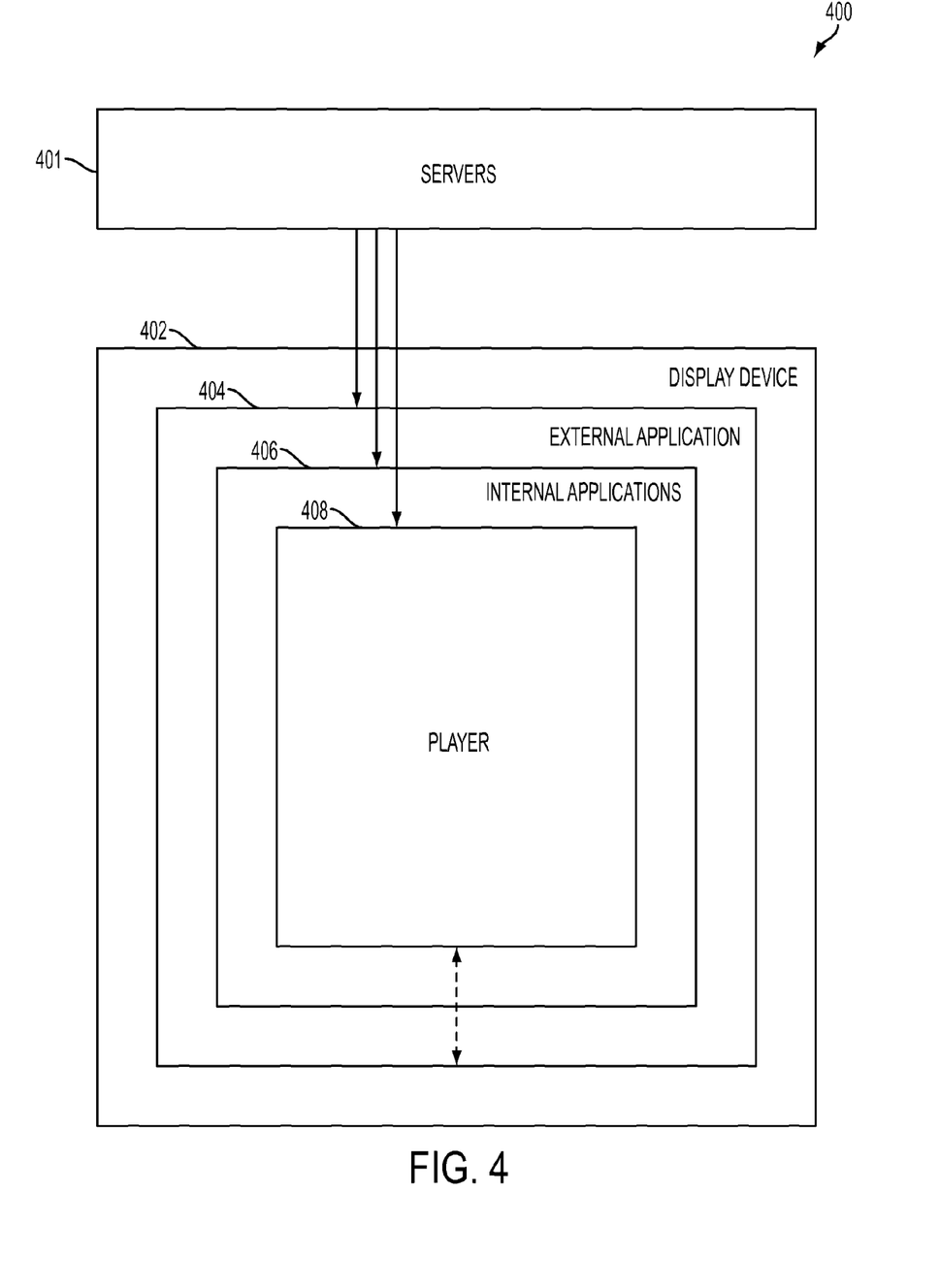
FIG. 4 illustrates an example of communication between multiple applications through entirely independent intermediary applications.

FIG. 4 illustrates an example 400 of communication between multiple applications through entirely independent intermediary applications. A display device (402) may load an application (404) from servers (401). Once this application loads, it in turn may load a set of internal applications (404) from servers (402). These applications, in turn, may load a player (408) (such as a video player) which may begin, in some instances with no knowledge of the external application (404). The internal applications (406) may then open a line of communication between the player (408) and the external application (404). Once this line of communication is open, the player (408) and the external application (404) may send and receive messages between each other without needing to interact with the internal applications (406) at all.

Herein, unless otherwise defined, "servers" is intended to include any set of distinct servers, including a single server hosting all applications, a cloud based server architecture hosting applications, the display device itself, or any combination of these.

Herein, unless otherwise defined, "external application" is intended to include any application which, as part of its execution, is capable of loading other applications.

Herein, unless otherwise defined, "the player" is intended to include a media player, or any other kind of application that operates from events (hardware, software, or other types) and/or user interactions.

Herein, unless otherwise defined, "internal applications" is intended to include a single application, or an external application containing one or more internal applications.

Figure 5:
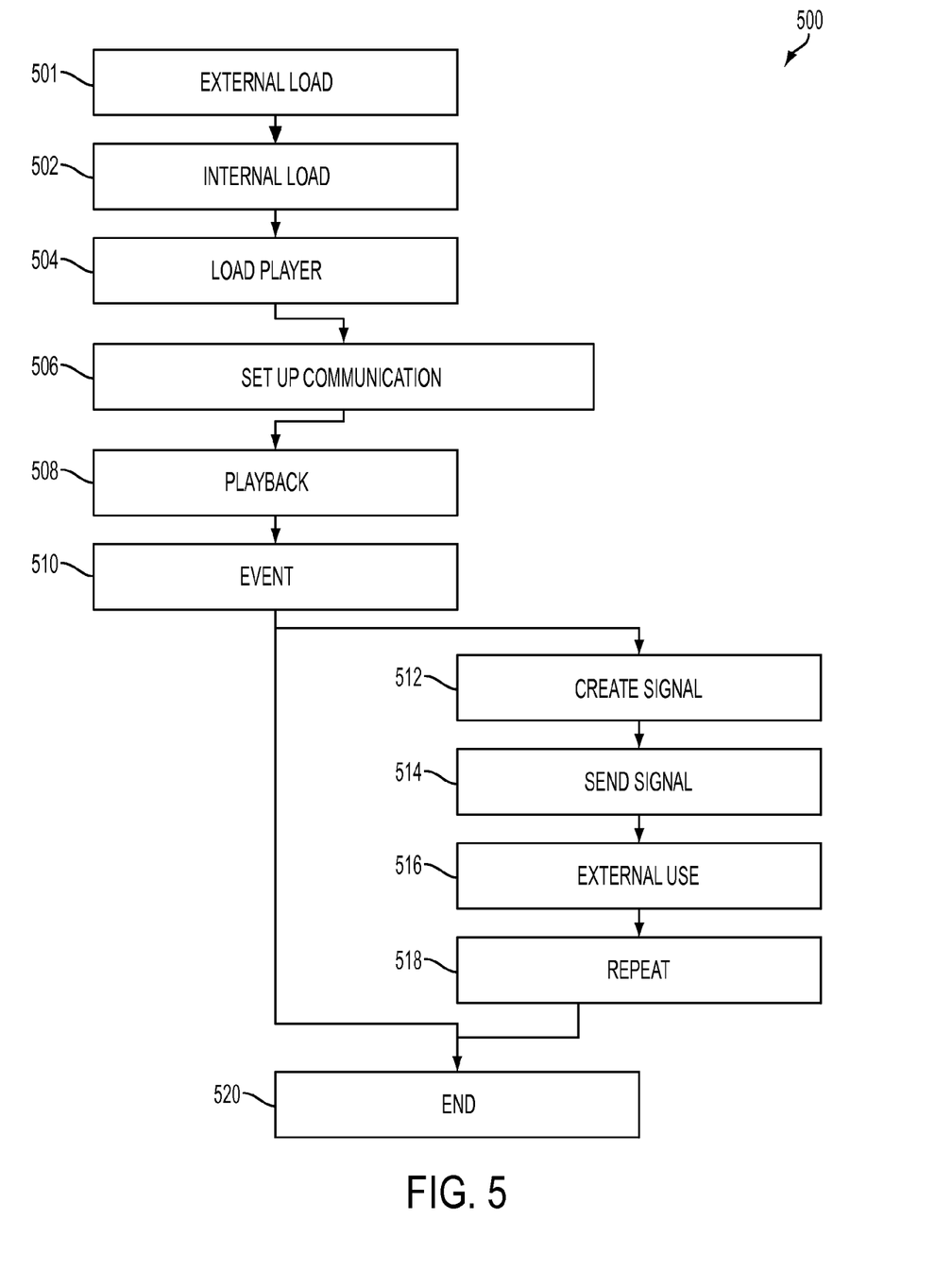
FIG. 5 describes an example operational flow of communication from the player to the external application.

FIG. 5 describes an example operational flow 500 of communication from the player to the external application. When the process begins, the external application may first load (501). At some point, the external application may load internal applications (502). After that, the internal applications may load the player (504).

Once the player has loaded, the external application may be provided with an indicator which will signal whenever an event occurs in the player (506). At this point, the player may begin its execution (508). During this execution, the player may encounter various events (510), at which point it may create a distinct signal that communicates the details of the event (512). This signal may then be sent to the indicator that was provided to the external application (514), which may respond to the signal in any way the external application deems appropriate (516). This process may repeat with every new event (518), until either the player or the external application terminates (520).

In general, an event may be any change in the state of the player, such as when a media file begins or ends playback, when a user performs some kind of interaction, when the media has moved forward in playback, etc.

In general, a signal may be any form of information about an event in the player, such as when a media file begins or ends playback, when a user performed some kind of interaction, when the media has moved forward in playback, etc.

Figure 6:
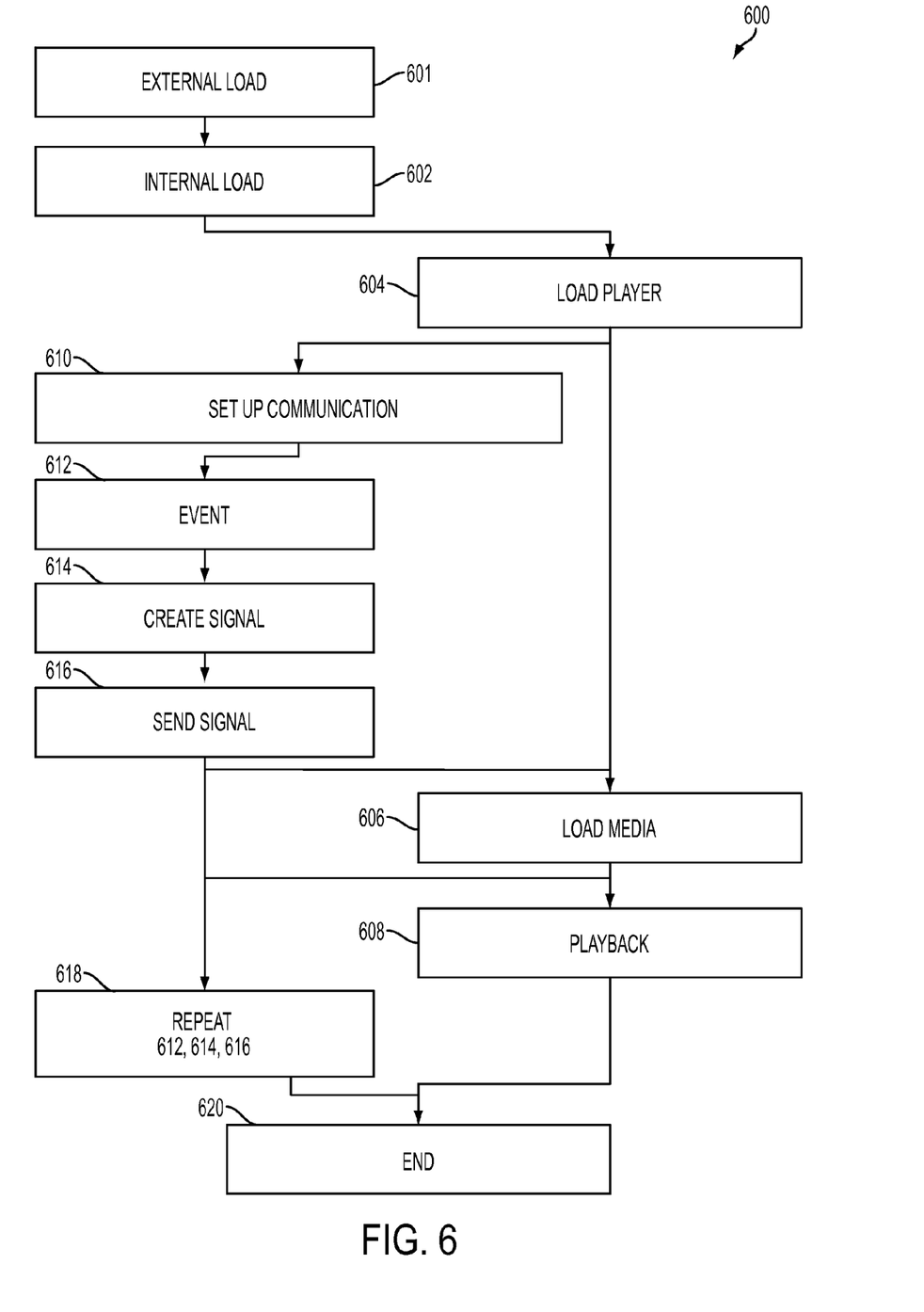
FIG. 6 describes an example operational flow of communication from the external application to the player.

FIG. 6 describes an example operational flow 600 of communication from the external application to the player. When the process begins, the external application may first load (601). At some point, the external application may load internal applications (602). After that, the internal applications may load the player (604). When the player loads, it may go about its normal process, including loading media (606), and playback (608).

In one example, independent of the player's behavior, a channel may be provided to the external application, through which it can send signals directly to the player (610). Once this channel is open, any time an event occurs in the external application (612), the external application may generate a signal (614) and then send this signal to the player through the channel (616). Whenever one of these signals is sent, the player may parse out the signal and then perform some action based on the information in the signal, such as loading new media (606) or modifying playback (608). This process may repeat whenever a new signal is sent (618), until either the player or the external application terminates (620).

In general, an event may be any change in the state of the external application, such as when a user performs some kind of interaction, a file is loaded, the application ends, etc. In general, a signal may be any form of information about a state change in the player, such as to start or stop playback, go to a specific point in a media file, load a new media file, etc.

In various implementations, a method may include loading an external application; loading an internal application by the external application; and loading a player by the internal applications. Further, the method may include providing a signal from the player to the external application that indicates the occurrence of an event in the player. Additionally, the method may include providing a reply signal from the external application to the player responsive to the signal sent from the player to the external application.

In some implementations, an electronic device may include a processor; a non-transitory computer readable storage medium connected to the processor; an external application stored on the storage medium and executable by the processor; a plurality of internal applications stored on the storage medium and executable by the processor, the plurality of internal applications being callable by the external application; and a player stored on the storage medium and executable by the processor, the player being callable by the plurality of internal applications.

As discussed above and illustrated in the accompanying Figures, the present disclosure discloses systems, methods, and computer program products for communication between applications. An external application may be loaded. The external application may load one or more internal applications. The internal application may load a player application, such as a video player. At least one communication channel may be configured between the external application and the player application. Subsequently, the player application may provide signals to the external application via the communication connection when one or more events occur. In response, the external application may perform one or more actions and/or may provide reply signals to the player application. Additionally, the player application may provide instructions to the external application and/or the external application may provide instructions to the player application.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

I claim:

1. A method, comprising:
    loading an external application from a remote computing device utilizing at least one processing unit such that the external application executes locally on a user computing device;
    loading at least one internal application in response to a command from the external application executed by the at least one processing unit, wherein the internal application is a component of the external application and is loaded as part of the external application loading from the remote computing device;
    loading at least one player application from a remote computing device in response to a command from the at least one internal application executed by the at least one processing unit; and
    configuring, through an operation of the internal application that is executed as part of the external application loading from the remote computing device, at least one communication channel between the external application executing locally on the user computing device and the at least one player application;
    wherein once the communication channel is configured, the external application and the at least one player application communicate across the communication channel without further involvement of the internal application.

2. The method of claim 1, further comprising providing at least one signal from the at least one player application to the external application across the at least one communication channel that indicates occurrence of at least one event in the at least one player application.

3. The method of claim 2, wherein the at least one event comprises at least one of a transition, a user interaction, an interface selection, a video transition, a portion complete, a time reached.

4. The method of claim 2, further comprising performing at least one action utilizing the external application in response to receiving the at least one signal.

5. The method of claim 4, wherein the at least one action comprises at least one of recording the occurrence of the at least one event, changing an aspect of a web page presented by the external application, transmitting at least one instruction to the at least one player application, adding at least one item to at least one shopping cart, utilizing at least one hardware component of at least one device incorporating the at least one processing unit, changing the content of the at least one player application, enabling at least one form, requiring at least one form, or presenting a different web page utilizing the external application.

6. The method of claim 2, further comprising providing at least one reply signal from the external application to the player application across the at least one communication channel responsive to the at least one signal sent from the player application to the external application.

7. The method of claim 1, further comprising providing at least one instruction from the at least one player application to the external application across the at least one communication channel.

8. The method of claim 7, wherein the at least one instruction comprises at least one instruction to perform at least one of change an aspect of a web page presented by the external application, add at least one item to at least one shopping cart, utilize at least one hardware component of at least one device incorporating the at least one processing unit, enable at least one form, require at least one form, or present a different web page utilizing the external application.

9. The method of claim 1, further comprising providing at least one instruction from the external application to the at least one player application across the at least one communication channel.

10. The method of claim 9, wherein the at least one instruction comprises at least one of an instruction to switch content being played, an instruction to pause play, an instruction to stop play, an instruction to fast forward play, an instruction to rewind play, an instruction to alter volume, or an instruction concerning an event for which the at least one player application is to monitor and report regarding.

11. The method of claim 1, wherein the external application comprises a web page.

12. The method of claim 11, wherein the at least one internal application comprises at least one component of the web page.

13. The method of claim 11, wherein said configuring at least one communication channel between the external application and the at least one player application further comprises including code for configuring the at least one communication channel in the web page.

14. The method of claim 13, further comprising executing the code for configuring the at least one communication channel.

15. The method of claim 13, wherein the code comprises at least one scripting language instruction.

16. The method of claim 1, wherein said configuring at least one communication channel between the external application and the at least one player application is performed utilizing at least one application programming interface.

17. The method of claim 1, wherein said configuring at least one communication channel between the external application and the at least one player application comprises negotiating at least one trusted connection.

18. The method of claim 1, wherein said configuring at least one communication channel between the external application and the at least one player application is performed by the at least one internal application.

19. The method of claim 1, wherein the at least one player application comprises a video player application.

20. A system, comprising:
at least one processing unit;
at least one a non-transitory computer readable storage medium connected to the at least one processor;
wherein the at least one processing unit executes instructions stored in the at least one non-transitory computer readable storage medium to:
load an external application from a remote computing device such that the external application executes locally on a user computing device;
load at least one internal application in response to a command from the external application, wherein the internal application is a component of the external application and is loaded as part of the external application loading from the remote computing device;
load at least one player application from a remote computing device in response to a command from the at least one internal application; and
configure, through an operation of the internal application that is executed as part of the external application loading from the remote computing device, at least one communication channel between the external application executing locally on the user computing device and the at least one player application;
wherein once the communication channel is configured, the external application and the at least one player application communicate across the communication channel without further involvement of the internal application.

21. A computer program product comprising:
a first set of instructions, stored in at least one non-transitory machine readable medium, executable by at least one processing unit to load an external application from a remote computing device such that the external application executes locally on a user computing device;
a second set of instructions, stored in the at least one non-transitory machine readable medium, executable by the at least one processing unit to load at least one internal application in response to a command from the external application, wherein the internal application is a component of the external application and is loaded as part of the external application loading from the remote computing device;
a third set of instructions, stored in the at least one non-transitory machine readable medium, executable by the at least one processing unit to load at least one player application from a remote computing device in response to a command from the at least one internal application; and
a fourth set of instructions, stored in the at least one non-transitory machine readable medium, executable by the at least one processing unit to configure, through an operation of the internal application that is executed as part of the external application loading from the remote computing device, at least one communication channel between the external application executing locally on the user computing device and the at least one player application;
wherein once the communication channel is configured, the external application and the at least one player application communicate across the communication channel without further involvement of the internal application.

* * * * *